United States Patent
Sunil Kumar et al.

(10) Patent No.: US 10,860,021 B2
(45) Date of Patent: Dec. 8, 2020

(54) METHOD AND SYSTEM FOR GUIDING AN AUTONOMOUS VEHICLE IN A FORWARD PATH IN REAL-TIME

(71) Applicant: WIPRO LIMITED, Bangalore (IN)

(72) Inventors: Balaji Sunil Kumar, Bengaluru (IN); Manas Sarkar, Kolkata (IN)

(73) Assignee: Wipro Limited, Bangalore (IN)

(*) Notice: Subject to any disclaimer, the term of this patent is extended or adjusted under 35 U.S.C. 154(b) by 312 days.

(21) Appl. No.: 15/884,625

(22) Filed: Jan. 31, 2018

(65) Prior Publication Data

US 2019/0187709 A1    Jun. 20, 2019

(30) Foreign Application Priority Data

Dec. 15, 2017 (IN) .............................. 201741045222

(51) Int. Cl.
| | | |
|---|---|---|
| G05D 1/00 | (2006.01) | |
| B62D 15/02 | (2006.01) | |
| B60W 30/09 | (2012.01) | |
| G05D 1/02 | (2020.01) | |
| G06K 9/00 | (2006.01) | |

(52) U.S. Cl.
CPC .......... *G05D 1/0088* (2013.01); *B60W 30/09* (2013.01); *B62D 15/0285* (2013.01); *G05D 1/0212* (2013.01); *G06K 9/00805* (2013.01)

(58) Field of Classification Search
CPC ... G05D 1/0088; G05D 1/0212; B60W 30/09; B62D 15/0285; G06K 9/00805

USPC .......................................................... 701/25
See application file for complete search history.

(56) References Cited

U.S. PATENT DOCUMENTS

| | | | |
|---|---|---|---|
| 9,227,632 B1* | 1/2016 | Lee ................... | B60W 30/0953 |
| 9,229,453 B1* | 1/2016 | Lee ....................... | G05D 1/0214 |
| 9,229,454 B1* | 1/2016 | Chiappetta ........... | G05D 1/0246 |
| 2009/0028388 A1* | 1/2009 | Amagasaki ........ | G06K 9/00798 |
| | | | 382/104 |
| 2011/0071717 A1* | 3/2011 | Lenneman ............ | B60R 16/005 |
| | | | 701/23 |
| 2014/0229069 A1* | 8/2014 | Akiyama .................. | B60T 7/12 |
| | | | 701/41 |

(Continued)

*Primary Examiner* — Bao Long T Nguyen
*Assistant Examiner* — Jean W Charleston
(74) *Attorney, Agent, or Firm* — Finnegan, Henderson, Farabow, Garrett & Dunner, LLP (57) ABSTRACT

The present disclosure discloses method and an autonomous navigation system for guiding an autonomous vehicle in forward path in real-time. The method comprises instructing the vehicle to terminate autonomous steering in a forward path, on identifying an angular difference, between a current orientation of the vehicle and orientation of a generated path, to be greater than a predefined threshold value and performing estimation of a frontal area for the vehicle based on a current speed, an orientation, and a width of the vehicle, calculation of a forward turning angle based on the angular difference and a length of the frontal area and guiding vehicle to manoeuvre steer at the forward turning angle within the frontal area, for every predefined time interval, until the angular difference is less than the predefined threshold value. Thus, the present disclosure provides an efficient method for guiding autonomous vehicle in forward path in real-time.

15 Claims, 6 Drawing Sheets

(56) References Cited

U.S. PATENT DOCUMENTS

| | | | |
|---|---|---|---|
| 2015/0210274 A1* | 7/2015 | Clarke | B60K 31/00 |
| | | | 382/104 |
| 2015/0353082 A1* | 12/2015 | Lee | B60W 30/09 |
| | | | 701/41 |
| 2015/0353085 A1* | 12/2015 | Lee | B60W 30/10 |
| | | | 701/533 |
| 2017/0158225 A1 | 6/2017 | Brown et al. | |

* cited by examiner

METHOD AND SYSTEM FOR GUIDING AN AUTONOMOUS VEHICLE IN A FORWARD PATH IN REAL-TIME

TECHNICAL FIELD

The present disclosure is related in general to field of automobile industry. Particularly, but not exclusively, the present disclosure relates to a method and system for guiding an autonomous vehicle in a forward path in real-time

BACKGROUND

Advancement in technology has led to numerous developments in various fields, and the field of automobile is no exception. The advancement in field of automobile has given rise to autonomous vehicle technology which aims to reduce energy consumption, pollution, and congestion while at the same time increasing road safety. The autonomous vehicle (also known as, a driverless vehicle) uses various sensing devices and techniques to detect their surroundings and path.

The autonomous vehicles today, can traverse a path to reach a destination point by generating command velocities such as, linear, and angular velocity to follow a planned navigation path. However, sometimes while aligning with the planned navigation path, there might exist deviation between the planned path and vehicle orientation. The deviation may become such that the vehicle navigation system generates an angular velocity based on vehicle's current speed, which is beyond vehicle's turning capability. Also, when a path in which the vehicle is traveling has a steep curve, the vehicle may not be able to traverse the curve easily, and manual intervention may be required in such circumstances. Thus, existing autonomous vehicles do not provide an efficient solution to address the above-mentioned problems.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for guiding an autonomous vehicle in a forward path in real-time. The method comprises instructing the vehicle to terminate autonomous steering in a forward path, on identifying an angular difference, between a current orientation of the vehicle and orientation of a generated path to be greater than a predefined threshold value and performing, for every predefined time interval, until the angular difference is less than the predefined threshold value, steps of, estimating a frontal area for the vehicle based on a current speed, an orientation, and a width of the vehicle, calculating a forward turning angle based on the angular difference and a length of the frontal area and guiding the vehicle to manoeuvre steer at the forward turning angle within the frontal area.

In an embodiment, the present disclosure relates to an Electronic Circuit Unit (ECU) of an autonomous vehicle for guiding the autonomous vehicle in a forward path in real-time. The ECU is configured to instruct the vehicle to terminate autonomous steering in a forward path, on identifying an angular difference between a current orientation of the vehicle and orientation of a generated path to be greater than a predefined threshold value and perform, for every predefined time interval, until the angular difference is less than the predefined threshold value, steps of estimating a frontal area for the vehicle based on a current speed, an orientation, and a width of the vehicle, calculating a forward turning angle based on the angular difference and a length of the frontal area and guiding the vehicle to manoeuvre steer at the forward turning angle within the frontal area.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and an autonomous navigation system for guiding a vehicle in a forward path in real-time. In an embodiment, an autonomous vehicle refers to a driverless vehicle. The autonomous vehicle may follow a pre-defined generated path based on a source and a destination point. The autonomous navigation system may instruct to terminate autonomous steering in a forward path, whenever an angular difference between a current orientation of the vehicle and orientation of a generated path is greater than a predefined threshold value. In an embodiment, the autonomous vehicle may identify the angular difference between the current orientation of the vehicle and orientation of the generated path at pre-defined intervals, when the autonomous vehicle follows the generated path. The autonomous navigation system may estimate a frontal area in the forward path based on a current speed, orientation and width of the vehicle and may calculate a forward turning angle. The forward turning angle may be calculated based on the angular difference and a length of the frontal area. The vehicle may be guided to manoeuvre at the forward turning angle within the frontal area. The autonomous navigation system may perform the estimation of frontal area, calculation of forward turning angle and guiding the vehicle, for every predefined time interval, until the angular difference is less than the predefined threshold value. In an embodiment, the predefined intervals associated with the autonomous vehicle while following the generated path and the pre-defined time interval during calculation of frontal area may be same. The present disclosure discloses a method for navigating a forward path having a steep curvature.

Figure 1:
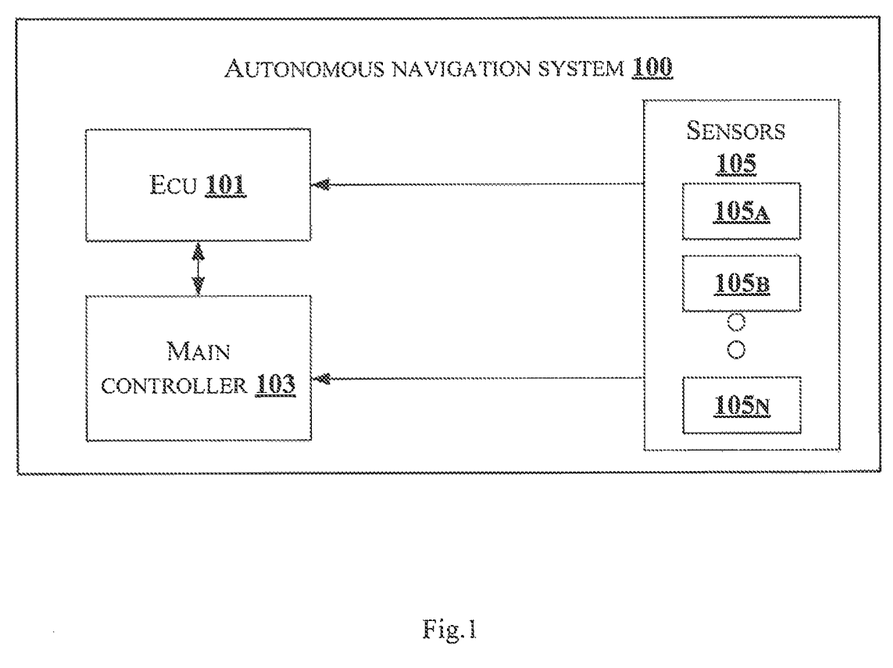
FIG. 1 illustrates an exemplary block diagram of an autonomous navigation system for guiding an autonomous vehicle in a forward path in real-time, in accordance with some embodiments of the present disclosure.

FIG. 1 illustrates an exemplary block diagram of an autonomous navigation system for guiding an autonomous vehicle in a forward path in real-time, in accordance with some embodiments of the present disclosure. As shown in FIG. 1, the autonomous navigation system 100 comprises an Electronic Control Unit (ECU) 101, a main controller 103, a sensor $105_A$, a sensor $105_B$, and a sensor $105_N$. In an embodiment, the sensor $105_A$, the sensor $105_B$, and the sensor $105_N$ may be collectively represented as one or more sensors 105. In an embodiment, the one or more sensors 105 may include, a Light Ranging and Detection (LIDAR) system, an ultrasound sensor, a camera, a proximity sensor, and the like. A person skilled in the art would understand that the one or more sensors 105 may include any other sensor, not mentioned explicitly in the present disclosure. In an embodiment, the main controller 103 may be used for autonomously navigating the vehicle in a generated path. For example, the generated path may be a primary path mapped by the main controller 103 to navigate the vehicle from a source location to a destination location. In an embodiment, the generated path may include a straight path, a curved path, or any other orientation of path. The ECU 101 may be used to guide the autonomous vehicle in the forward path in real-time. In an embodiment, the ECU 101 may be integrated with the main controller 103 or may be a stand-alone unit associated with the main controller 103. The ECU 101 may periodically receive an angular velocity of the vehicle, calculated by the main controller 103. Further, the ECU 101 may check an angular difference between a current orientation of the vehicle and an orientation of the generated path at pre-defined intervals, on receiving the angular velocity. In case, the ECU 101 identifies that the angular difference is greater than a predefined threshold value, then the ECU 101 may immediately instruct the main controller 103 to terminate an autonomous steering of the vehicle in the forward path. In an embodiment, the angular difference being more than the predefined threshold value indicates that an angular velocity required by the vehicle to mitigate the deviation is beyond the vehicle turning capacity. Thus, the ECU 101 may estimate a frontal area for the vehicle based on a current speed, orientation, and width of the vehicle. In an embodiment, the frontal area may be the area in front of the vehicle within which the vehicle may manoeuvre with smooth curve. For example, a vehicle with high speed may estimate the frontal area of large distance. In an embodiment, the frontal area may be in a pre-defined geometrical shape. The pre-defined geometrical shape may include such as, square, trapezoid, rectangle, and the like. In an embodiment, the frontal area is free from one or more obstacles. Further, the ECU 101 may calculate a forward turning angle for the vehicle based on the angular difference and a length of the frontal area. Further, the ECU 101 may guide the vehicle to manoeuvre steering at the forward turning angle within the frontal area. The ECU 101 may perform the estimation of the frontal area, calculation of the forward turning angle and guidance, for every predefined time interval, until the angular difference is less than the predefined threshold.

Figure 2:
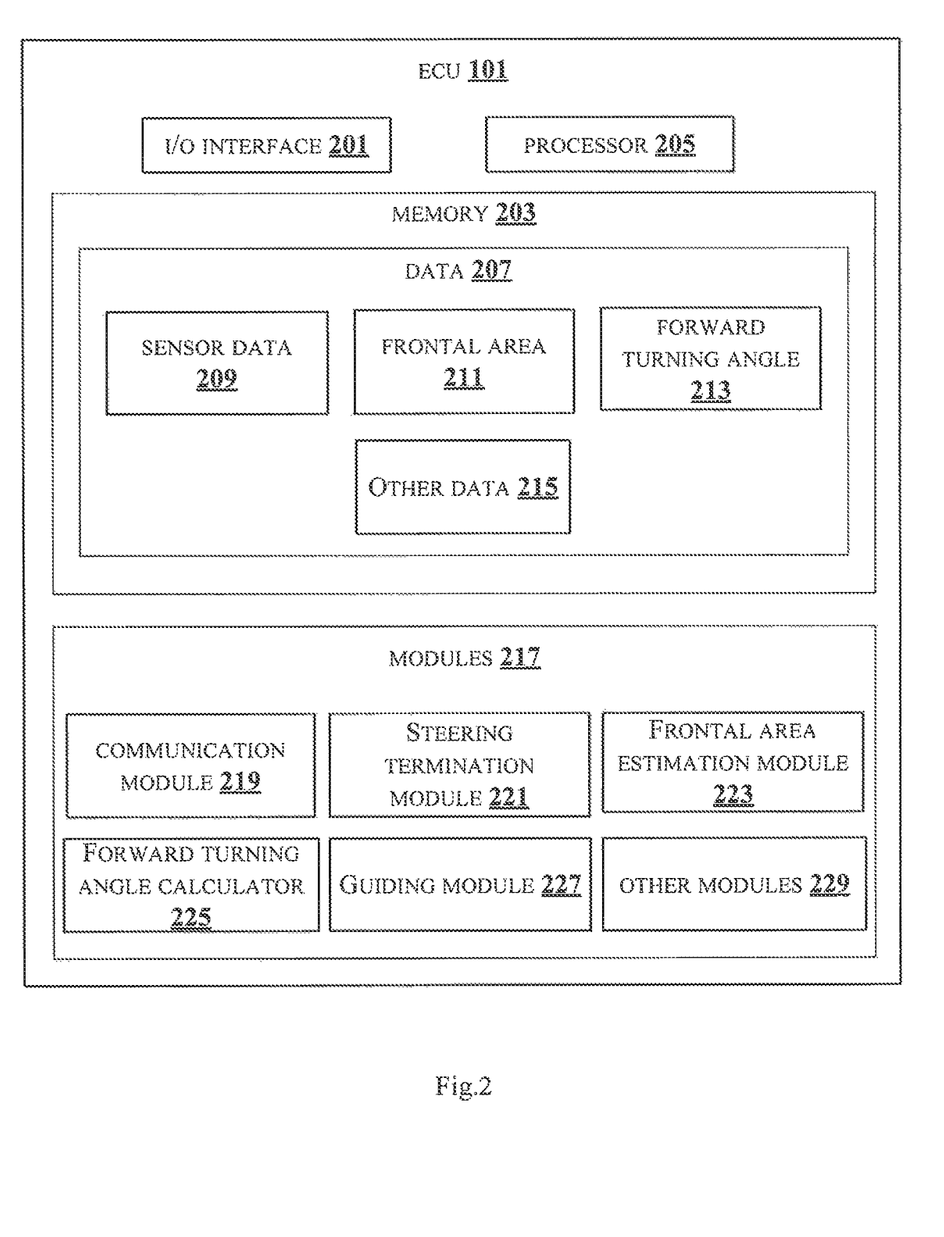
FIG. 2 is a block diagram of internal architecture of an ECU configured to guide an autonomous vehicle in a forward path in real-time, in accordance with some embodiments of the present disclosure.

FIG. 2 illustrates an internal architecture of an ECU configured to guide an autonomous vehicle in a forward path in real-time in accordance with some embodiments of the present disclosure. The ECU 101 may include at least one Central Processing Unit ("CPU" or "processor") 205 and a memory 203 storing instructions executable by the at least one processor 205. The processor 205 may comprise at least one data processor for executing program components for executing user or system-generated requests. The memory 203 is communicatively coupled to the processor 205. The ECU 101 further comprises an Input/Output (I/O) interface 201. The I/O interface 201 is coupled with the processor 205 through which an input signal or/and an output signal is communicated.

In an embodiment, data 207 may be stored within the memory 203. The data 207 may include, for example, a sensor data 209, a frontal area 211, a forward turning angle 213 and other data 215.

The sensor data 209 may include information regarding all views and directions around the vehicle. The one or more sensors 105 may detect the one or more obstacles in the generated path and provide information regarding the obstacles to the ECU 101. For example, the one or more obstacles may include stationary and movable obstacles. The stationary obstacles may include, a stone, a pit etc., and the movable obstacles may include a person, another vehicle etc. Further, the sensor data 209 may include the predefined threshold value of angular difference between the orientation of the vehicle and the orientation of the generated path.

The frontal area 211 may be an area estimated on identifying the angular difference between the current orientation of the vehicle and orientation of the generated path to be greater than the predefined threshold value. The frontal area 211 may be estimated based on the current speed, the orientation and width of the vehicle.

The forward turning angle 213 may be a turning angle calculated based on the angular difference and the length of the frontal area 211. In an embodiment, the forward turning angle 213 may be calculated until the angular difference becomes less than the predefined threshold value.

The other data 215 may comprise but is not limited to traffic information, terrain information, and the like.

In an embodiment, the data 207 in the memory 203 is processed by modules 217 of the ECU 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 217 when configured with the functionality defined in the present disclosure will result in a novel hardware.

In one implementation, the modules 217 may include, for example, a communication module 219, a steering termination module 221, a frontal area estimation module 223, a forward turning angle calculator 225, a guiding module 227 and other modules 229. It will be appreciated that such aforementioned modules 217 may be represented as a single module or a combination of different modules.

The communication module 219 may be used for communication between the ECU 101 and other units (not shown in figures) of the vehicle. In an embodiment, the other units may comprise, but are not limited to, a transmission control unit, a door unit, a steering controller, an indication unit, etc. For example, the communication module 219 may receive information regarding the generated path and associated angular velocity from the main controller 103. Further, the communication module 219 may communicate the information received from the main controller 103 to the ECU 101. In an embodiment, the communication module 219 may convey instructions to the main controller 103. In an embodiment, the communication module 219 may receive sensor data 209 from the one or more sensors 105 and provide the sensor data 209 to the ECU 101. Also, the communication module 219 may communicate instructions to the one or more sensors 105 regarding activation and deactivation of the one or more sensors 105.

The steering termination module 221 may generate a signal to the main controller 103 upon identifying the angular difference to be greater than the predefined threshold value. The signal may indicate instruction for termination of the autonomous steering in the forward path.

The frontal area estimation module 223 may estimate the frontal area for the vehicle. The forward turning angle calculator 225 may calculate the forward turning angle towards the generated path for the vehicle. The guiding module 227 may guide the vehicle to manoeuvre steer within the frontal area.

The estimation of the frontal area, calculation of the forward turning angle and guidance to manoeuvre steer within the frontal area is performed for every predefined time interval, until the angular difference is less than the predefined threshold value.

The frontal area estimation module 223 may estimate the frontal area for the vehicle once the steering termination module 221 terminates the steering of the vehicle in the generated path. The frontal area estimation module 223 may estimate the frontal area based on the current speed, orientation, and width of the vehicle. In an embodiment, the frontal area estimation module 223 estimates the frontal area which is free from the one or more obstacles. In an embodiment, the frontal area may be in a predefined geometrical shape such as, trapezoid, rectangle, square etc. The frontal area estimation module 223 may estimate the frontal area by determining a central orientation line and associated array points from a current position of the vehicle. In an embodiment, the number of the array points is based on the current speed of the vehicle. The frontal area estimation module 223 may identify a line perpendicular to the central orientation line, passing through each of the array points on both sides of the central orientation line. Further, the frontal area estimation module 223 may identify a plurality of direction points for each of the perpendicular line and estimates the frontal area based on the plurality of direction points of each of the perpendicular line of both sides of the central orientation line. In an embodiment, the plurality of direction points may be equal in number with respect to central orientation line on each perpendicular line identified towards the generated path. In an embodiment, the plurality of direction points on each perpendicular line identified towards opposite direction of the generated path reduces from nearest point of the vehicle to furthest point of the geometrical shape. In an embodiment, estimating the frontal area comprises searching for the frontal area away from the generated path based on orientation of the vehicle. The forward turning angle calculator 225 may calculate the forward turning angle towards the generated path based on the angular difference and a length of the frontal area. The forward turning angle calculator 225 may calculate the forward turning angle by considering a part of frontal area in which the plurality of direction points may be equal in number with respect to central orientation line of each perpendicular line identified towards the generated path. The forward turning angle calculator 225 may determine a diagonal line in the part by drawing a straight line between two opposite corners of the part of the frontal area. Further, the forward turning angle calculator 225 may calculate a turning angle between the diagonal line and a longer side of the part of the frontal area.

The guiding module 227 may receive the forward turning angle and details regarding the frontal area from the forward turning angle calculator 225 and the frontal area estimation module 223 respectively. The guiding module 227 may guide the vehicle to manoeuvre steer within the frontal area at the forward turning angle. In an embodiment, the vehicle may be guided at the forward turning angle, determined for every predefined time interval, until the angular difference becomes less than the predefined threshold value. Once the vehicle is guided, and the angular difference becomes less than the predefined threshold value, the guiding module 227 may provide control to the main controller 103 to follow the generated path autonomously.

In an embodiment, the other modules 229 may include, but is not limited to, an indication module to indicate one or more obstacles in the generated path, etc.

Figure 3:
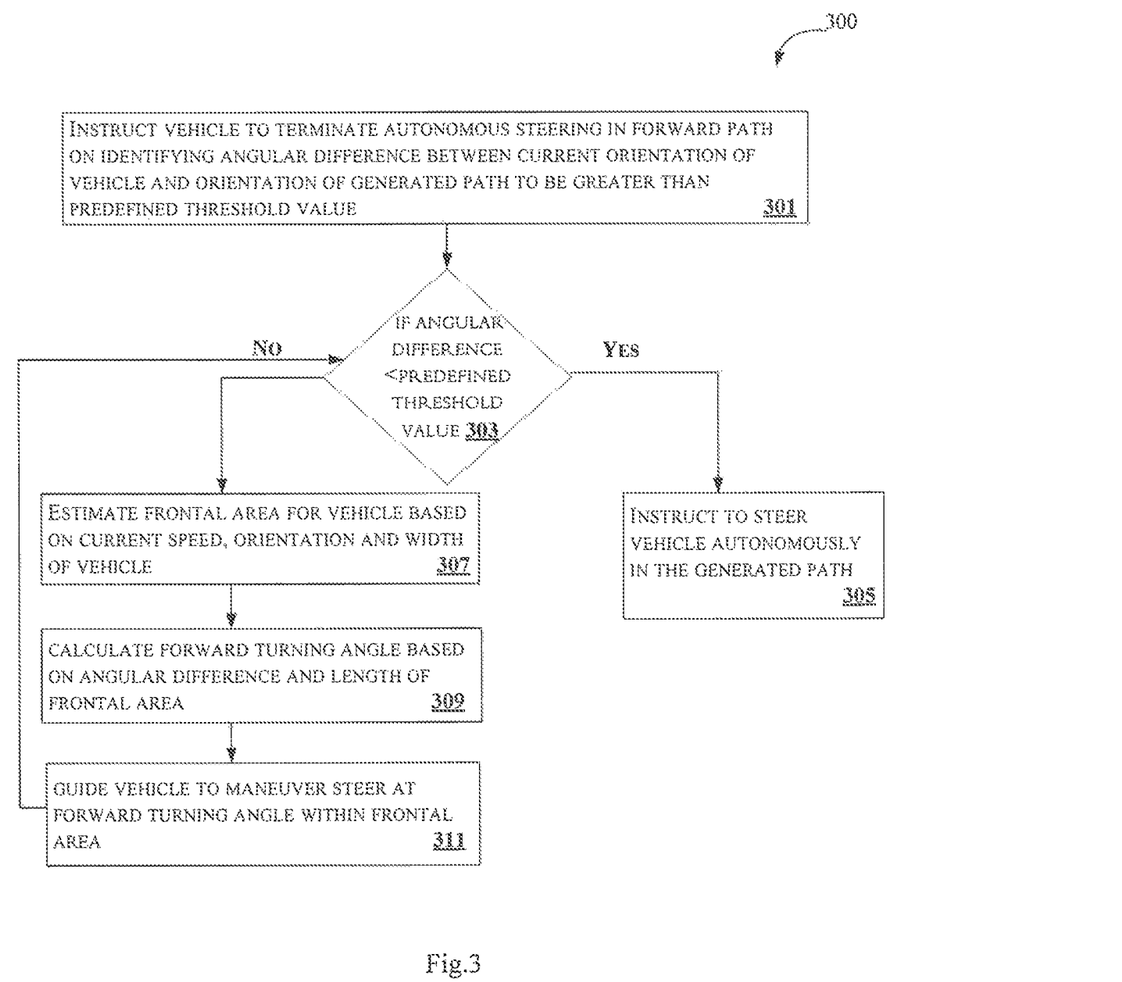
FIG. 3 illustrates a flowchart showing a method for guiding an autonomous vehicle in a forward path in real-time, in accordance with some embodiments of the present disclosure.

FIG. 3 illustrates a flowchart showing a method for guiding an autonomous vehicle in a forward path in real-time, in accordance with some embodiments of the present disclosure.

As illustrated in FIG. 3, the method 300 may comprise one or more steps for guiding the autonomous vehicle in forward path in real-time, in accordance with some embodiments of the present disclosure. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 301, the steering termination module 221 receives the angular velocity from the communication module 219. The ECU 101 identifies angular difference between the orientation of the vehicle and the orientation of the generated path. When the angular difference is more than the predefined threshold, the steering termination module 221 may generate the signal to be communicated to the main controller 103 for terminating steering of the vehicle in the forward path. For example, let us consider that the pre-defined threshold value is "60". When the angular difference is more than "60", the steering termination module 221 generates the signal for terminating steering of the vehicle in the forward path. In an embodiment, the predefined threshold value may vary based on obstacles of the forward path, curvature of the forward path, vehicle capacity etc.

At step 303, the ECU 101 checks, for every predefined time interval, if the angular difference is less than the predefined threshold value. In case the angular difference is less than the predefined threshold value, the method moves to block 305. Alternatively, if the angular difference is greater than the predefined threshold value, the method moves to block 307.

At block 305, the ECU 101 instructs the main controller 103 to steer the vehicle in the generated path autonomously.

At step 307, the frontal area estimation module 223 estimates the frontal area for the vehicle based on the current speed, orientation, and width of the vehicle. In an embodiment, the frontal area may be in the predefined geometrical shape.

At step 309, the forward turning angle calculator 225 calculates the forward turning angle for the vehicle based on the angular difference and length of the frontal area.

At step 311, the guiding module 227 guides the vehicle to manoeuvre steer of the vehicle at the forward turning angle within the frontal area.

Figure 4A:
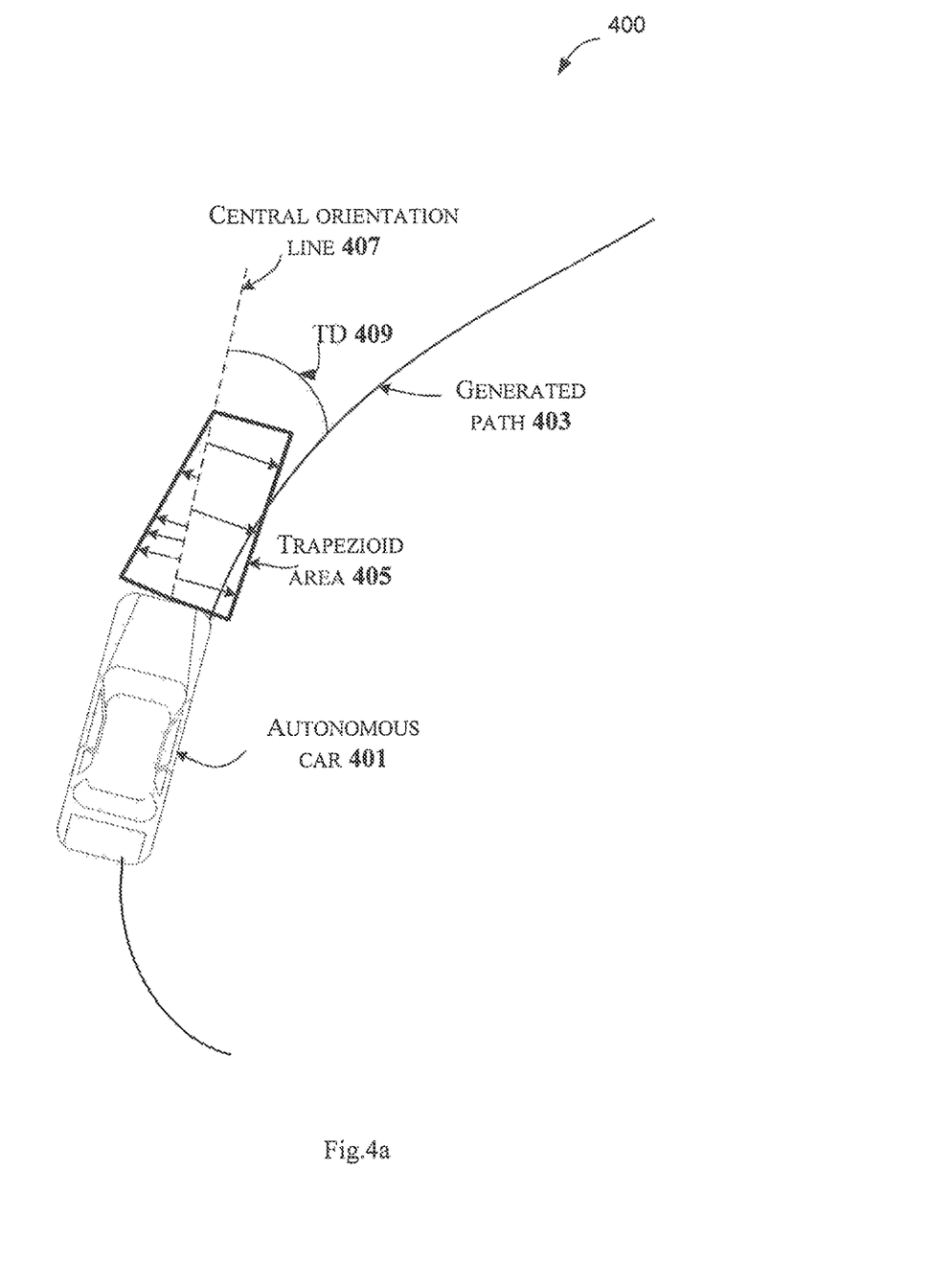
FIG. 4a shows an exemplary embodiment to guide a vehicle, i.e., a car to manoeuvre steering in the frontal area in accordance with some embodiments of the present disclosure.

FIG. 4*a* shows an exemplary embodiment to guide a vehicle, i.e., car to manoeuvre steering in the frontal area in accordance with some embodiments of the present disclosure.

Figure 4B:
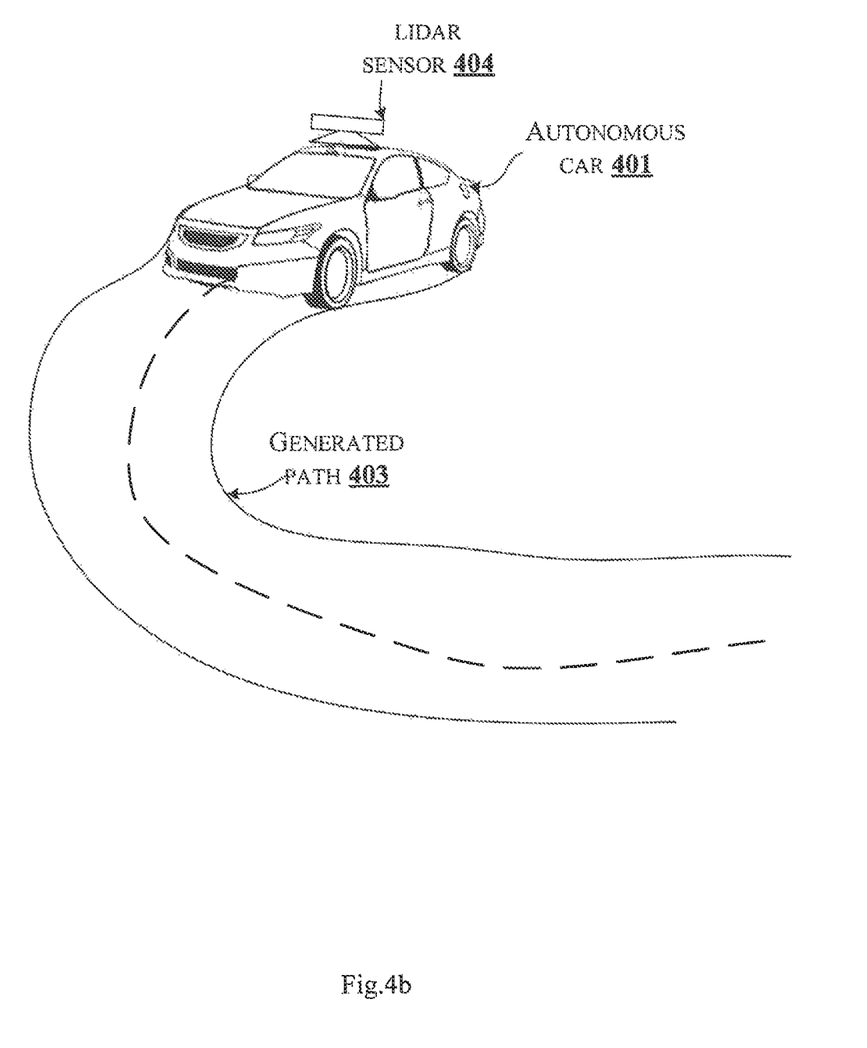
FIG. 4b shows an exemplary autonomous car with sensor coverage for monitoring nearby field of a generated path for autonomously steering in accordance with some embodiments of the present disclosure.
Figure 4C:
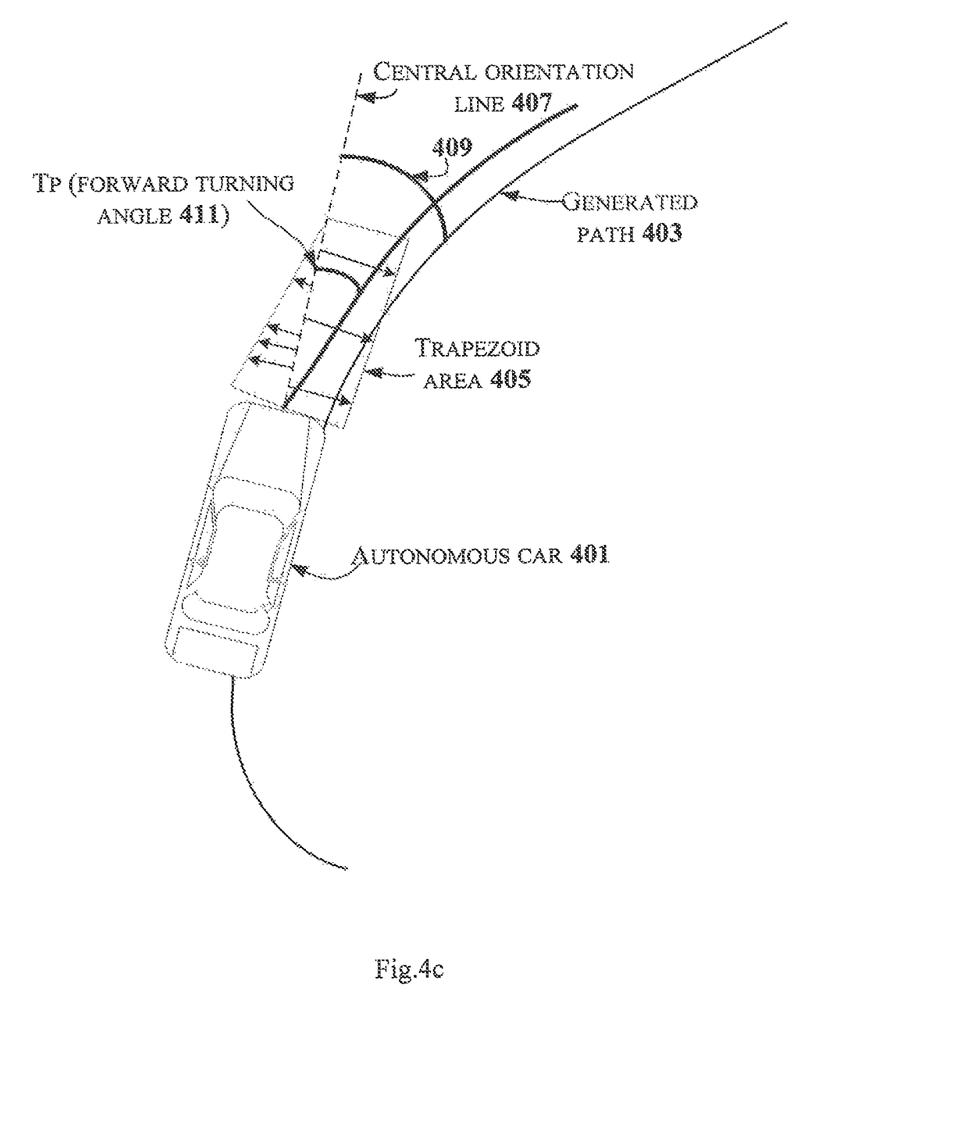
FIG. 4c shows an exemplary representation of forward turning angle in accordance with some embodiment of present disclosure.

As shown in FIG. 4*a*, the environment 400 illustrates a scenario of guiding a car to manoeuvre steering in forward direction in an exemplary embodiment of the present disclosure. The environment 400 comprises an autonomous car 401 moving in a generated path 403, which is a curve. The autonomous car 401 may include the ECU 101 and one or more sensors 105 (not shown explicitly in the FIG. 4*a*). The one or more sensors 105 may be placed at predefined positions on the car 401. For example, the one or more sensors 105 may be placed at top view or at front of the car 401. FIG. 4*b* shows an exemplary autonomous car with sensor coverage for monitoring nearby field of a generated path for autonomously steering in accordance with some embodiments of the present disclosure. In the FIG. 4*b*, an autonomous car 401 comprises a LIDAR sensor 404, mounted on at top portion of the autonomous car 401. The LIDAR sensor 404 may monitor the generated path 403 and may check for one or more obstacles in the generated path 403. Further, returning to FIG. 4*a*, the ECU 101 of the car 401 may receive an angular velocity (TD) 409 associated with the generated path 403 from the main controller 103 of the car 401, at predefined time of intervals. Using the TD 409, the ECU 101 of the car 401 identifies angular difference between the orientation of the car 401 and the orientation of the generated path 403. The identified angular difference is compared with the predefined threshold value of the angular difference. In case, the angular difference is greater than the pre-defined threshold value, the ECU 101 of the car 401 instructs to terminate steering of the car 401 in the generated path 403. Consider, that the angular difference between the orientation of the car 401 and the orientation of the generated path 403 is "60" and the predefined threshold value is "30". In such condition, the ECU 101 of the car 401 instructs to terminate autonomous steering of the car 401 in the generated path 403. Further, the ECU 101 of the car 401 estimates the frontal area for the car 401 based on the current speed, orientation, and width of the car 401. As shown in FIG. 4*a*, the frontal area is a trapezoid area 405. A person skilled in the art would understand that FIG. 4*a* is an exemplary embodiment and the frontal area may be in any predefined geometrical shape. The ECU 101 of the car 401 determines a central orientation line 407 and associated array points on the line based on current position and orientation of the car 401. In an embodiment, the number of array points depends based on the current speed of the car 401. Further, for each of the array points, the ECU 101 of the car 401 determines a perpendicular to the central orientation line 407, which pass through the array points. The ECU 101 identifies the plurality of direction points on each of the perpendicular line, on both side of the central orientation line 407. The plurality of perpendicular direction points on right side of the central orientation line 407 are traced for equal number for each perpendicular line. As shown in FIG. 4*a*, the direction points on the perpendicular line towards left side of the central orientation line 407 are reducing from nearest point of car 401 to furthest point of the trapezoid area 405, thus maintaining a slope. Once the trapezoid area 405 is estimated, the ECU 101 of the car 401 calculates a forward turning angle (TP 411) as shown in FIG. 4*c* and guides the car 401 to manoeuvre steer at the TP 411. FIG. 4*c* shows an exemplary representation of forward turning angle in accordance with some embodiment of present disclosure. As shown in the FIG. 4*c*, the TP 411 is highlighted, which is smaller than the TD 409. The ECU 101 of the car 401 estimates the trapezoid area 405 at every predefined time interval and continuously calculates the TP 411 and guides the car 401 at the TP 411 until the angular difference becomes less than the predefined threshold value i.e., less than "30". Consider that the TP 411 is calculated to be "50 degrees and the predefined time interval is 300 millisecond minute. In such case, the ECU 101 of the car 401 guides the car 401 at the TP 411 "50 degree 300 millisecond. While, the car 401 is guided, the ECU 101 checks the angular difference with the predefined threshold value "30", estimates a new trapezoid area, and calculates TP 411 as "40 degree". The ECU 101 guides the car 401 with the TP 411 as "40 degrees" for 300 millisecond. The process repeats until deviation between the orientation of the car 401 and orientation of the generated path 403 reduces below the predefined threshold, i.e., "30". Once, the angular difference is less than the predefined threshold value "30", the ECU 101 of the car 401 instructs the main controller 103 to steer the car 401 autonomously in the generated path 403.

In an embodiment, the present disclosure is performed in real-time.

In an embodiment, the present disclosure discloses a method and an autonomous navigation system for guiding the vehicle in the forward path during any steep curve.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Autonomous navigation system |
| 101 | ECU |
| 103 | Main controller |
| 105 | One or more sensors |
| 201 | I/O Interface |
| 203 | Memory |
| 205 | Processor |
| 207 | Data |
| 209 | Sensor data |
| 211 | Frontal area |
| 213 | Forward turning angle |
| 215 | Other data |
| 217 | Modules |
| 219 | Communication module |
| 221 | Steering termination module |
| 223 | Frontal area estimation module |
| 225 | Forward turning angle calculator |
| 227 | Guiding module |
| 229 | Other modules |
| 401 | Car |
| 403 | Generated path |
| 404 | LIDAR sensor |
| 405 | Trapezoid area |
| 407 | Central orientation line |
| 409 | Angular velocity |
| 411 | Forward turning angle |

We claim:

1. A method for guiding an autonomous vehicle in a forward path in real-time, comprising:

instructing, by an Electronic Control Unit (ECU) of the vehicle, the vehicle to terminate autonomous steering in a forward path, on identifying an angular difference, between a current orientation of the vehicle and an orientation of a generated path, to be greater than a predefined threshold value; and performing, by the ECU, for every predefined time interval, until the angular difference is less than the predefined threshold value, steps of:

estimating, by the ECU, a frontal area for the vehicle based on a current speed, an orientation, and a width of the vehicle, wherein estimating the frontal area comprises:

identifying a plurality of direction points for each of a line perpendicular to a central orientation line of the vehicle and passes through each array points determined from a current position of the vehicle and associated with the central orientation line, wherein the plurality of direction points identified towards opposite direction of the generated path reduces from nearest point of the vehicle to the furthest point of the frontal area;

calculating, by the ECU, a forward turning angle based on the angular difference and a length of the frontal area; and guiding, by the ECU, the vehicle to manoeuvre to steer at the forward turning angle within the frontal area.

2. The method as claimed in claim 1, wherein the frontal area is in a predefined geometrical shape.

3. The method as claimed in claim 1, wherein the frontal area is free from one or more obstacles.

4. The method as claimed in claim 1, wherein estimating the frontal area further comprises:
   determining, by the ECU, the central orientation line and associated array points from the current position of the vehicle;
   identifying, by the ECU, the line perpendicular to the central orientation line, passing through each of the array points on both sides of the central orientation line; and
   estimating, by the ECU, the frontal area based on the plurality of direction points of each of the perpendicular line of both sides of the central orientation line.

5. The method as claimed in claim 4, wherein number of the array points is based on the current speed of the vehicle.

6. The method as claimed in claim 4, wherein the plurality of direction points is equal in number with respect to the central orientation line on each perpendicular line identified towards the generated path.

7. The method as claimed in claim 1, wherein estimating the frontal area further comprises searching for the frontal area away from the generated path based on the orientation of the vehicle.

8. An Electronic Control Unit (ECU) for guiding an autonomous vehicle in a forward path in real-time, configured to:
   instruct the vehicle to terminate autonomous steering in a forward path, on identifying an angular difference, between a current orientation of the vehicle and an orientation of a generated path, to be greater than a predefined threshold value; and
   perform, for every predefined time interval, until the angular difference is less than the predefined threshold value, steps of:
   estimate a frontal area for the vehicle based on a current speed, an orientation, and a width of the vehicle, wherein estimating the frontal area comprises:
      identifying a plurality of direction points for each of a line perpendicular to a central orientation line of the vehicle and passes through each array points determined from a current position of the vehicle and associated with the central orientation line, wherein the plurality of direction points identified towards opposite direction of the generated path reduces from nearest point of the vehicle to the furthest point of the frontal area;
   calculate a forward turning angle based on the angular difference and a length of the frontal area; and
   guide the vehicle to manoeuvre to steer at the forward turning angle within the frontal area.

9. The ECU as claimed in claim 8, wherein the frontal area is in a predefined geometrical shape.

10. The ECU as claimed in claim 8, wherein the frontal area is free from one or more obstacles.

11. The ECU as claimed in claim 8, wherein the processor is further configured to estimate the frontal area by:
    determining the central orientation line and associated array points from the current position of the vehicle;
    identifying the line perpendicular to the central orientation line, passing through each of the array points on both sides of the central orientation line; and
    estimating the frontal area based on the plurality of direction points of each of the perpendicular line of both sides of the central orientation line.

12. The ECU as claimed in claim 11, wherein number of the array points is based on the current speed of the vehicle.

13. The ECU as claimed in claim 11, wherein the plurality of direction points is equal in number with respect to the central orientation line on each perpendicular line identified towards the generated path.

14. The ECU as claimed in claim 8, wherein the processor is further configured to estimate the frontal area by searching for the frontal area away from the generated path based on the orientation of the vehicle.

15. A non-transitory computer-readable storage medium having stored thereon, a set of computer-executable instructions causing a computer comprising one or more processors to perform steps comprising:
    instructing, a vehicle to terminate autonomous steering in a forward path, on identifying an angular difference, between a current orientation of the vehicle and an orientation of a generated path, to be greater than a predefined threshold value; and
    performing, for every predefined time interval, until the angular difference is less than the predefined threshold value, steps of:
    estimating, a frontal area for the vehicle based on a current speed, an orientation, and a width of the vehicle, wherein estimating the frontal area comprises:
       identifying a plurality of direction points for each of a line perpendicular to a central orientation line of the vehicle and passes through each array point determined from a current position of the vehicle and associated with the central orientation line, wherein the plurality of direction points identified towards opposite direction of the generated path reduces from nearest point of the vehicle to the furthest point of the frontal area;
    calculating, a forward turning angle based on the angular difference and a length of the frontal area; and
    guiding, the vehicle to manoeuvre to steer at the forward turning angle within the frontal area.

\* \* \* \* \*